(12) United States Patent
Hachitani

(10) Patent No.: US 7,989,377 B2
(45) Date of Patent: Aug. 2, 2011

(54) OPTICAL GLASS AND OPTICAL ELEMENT

(75) Inventor: Youichi Hachitani, Tokyo (JP)

(73) Assignee: Hoya Corporation, Tokyo (JP)

( * ) Notice: Subject to any disclaimer, the term of this patent is extended or adjusted under 35 U.S.C. 154(b) by 586 days.

(21) Appl. No.: 11/987,805

(22) Filed: Dec. 4, 2007

(65) Prior Publication Data

US 2008/0132400 A1  Jun. 5, 2008

(30) Foreign Application Priority Data

Dec. 5, 2006  (JP) .................................. 2006-328631

(51) Int. Cl.
*C03C 3/247* (2006.01)
*C03C 3/16* (2006.01)
*C03C 3/17* (2006.01)

(52) U.S. Cl. ................................ 501/44; 501/45; 501/48

(58) Field of Classification Search .................... 501/44, 501/45, 48
See application file for complete search history.

(56) References Cited

U.S. PATENT DOCUMENTS

| | | | |
|---|---|---|---|
| 4,990,468 A | 2/1991 | Komiya et al. | |
| 7,192,897 B2 * | 3/2007 | Yamane et al. | 501/44 |
| 7,396,787 B2 * | 7/2008 | Ritter et al. | 501/48 |
| 7,595,272 B2 * | 9/2009 | Ikenishi et al. | 501/48 |
| 7,598,189 B2 * | 10/2009 | Fujiwara et al. | 501/48 |
| 2004/0082460 A1 | 4/2004 | Yamane et al. | |
| 2004/0087428 A1 | 5/2004 | Otsuka et al. | |
| 2004/0259714 A1 * | 12/2004 | Fujiwara et al. | 501/45 |
| 2005/0054511 A1 * | 3/2005 | Fujiwara et al. | 501/45 |
| 2006/0150682 A1 * | 7/2006 | Fujiwara et al. | 65/102 |
| 2006/0223689 A1 * | 10/2006 | Ikenishi et al. | 501/45 |
| 2007/0027017 A1 * | 2/2007 | Hachitani | 501/47 |
| 2007/0060464 A1 * | 3/2007 | Ikenishi et al. | 501/48 |
| 2009/0314033 A1 * | 12/2009 | Zou et al. | 65/60.1 |
| 2009/0325774 A1 * | 12/2009 | Ikenishi | 501/30 |

FOREIGN PATENT DOCUMENTS

| | | |
|---|---|---|
| EP | 1 707 541 A1 | 10/2006 |
| JP | 53-105517 | 9/1978 |
| JP | 55-144448 | 11/1980 |
| JP | 1-219037 | 9/1989 |
| JP | 2-124740 | 5/1990 |
| JP | 2-204342 | 8/1990 |
| JP | 04-43854 | 7/1992 |
| JP | 6-157068 | 6/1994 |
| JP | 8-104538 | 4/1996 |
| JP | 9-211505 | 8/1997 |
| JP | 2003-40645 | 2/2003 |
| JP | 2003-95694 | 4/2003 |
| JP | 2003-160356 | 6/2003 |
| JP | 2004-83290 | 3/2004 |
| JP | 2004-137100 | 5/2004 |
| JP | 2005-75687 | 3/2005 |
| WO | WO 03/037813 A1 | 5/2003 |
| WO | WO 2007/114172 A1 | 10/2007 |

* cited by examiner

*Primary Examiner* — Karl Group
*Assistant Examiner* — Elizabeth A Bolden
(74) *Attorney, Agent, or Firm* — Nixon & Vanderhye P.C.

(57) ABSTRACT

Provided is an optical glasses that has high refractivity and low dispersion and anomalous partial dispersion capability and that has excellent processability and devitrification resistance and ensures that the occurrence of striae can be inhibited, the optical glass including an optical glass having a refractive index (nd) of 1.54 to 1.60, an Abbe's number (vd) of 65 to 78, a partial dispersion ratio of 0.530 or more, a specific gravity of 4.0 or less and a viscosity, measured at its liquidus temperature, of 4 dPa·s or more and an optical glass comprising as cationic components, by cationic %, 20 to 50% of $P^{5+}$, 0.1 to 20% of $Al^{3+}$, 0.1 to 20% of $Mg^{2+}$, 0 to 20% of $Ca^{2+}$, 0 to 20% of $Sr^{2+}$, 0.1 to 30% of $Ba^{2+}$ and 0 to 10% of $Y^{3+}$, and further comprising, as anionic components, $F^-$ and $O^{2-}$, wherein the ratio of the content of $Mg^{2+}$ to the content of $Al^{3+}$, $Mg^{2+}/Al^{3+}$, based on cationic %, is 1.2 or less.

4 Claims, No Drawings

OPTICAL GLASS AND OPTICAL ELEMENT

This application claims priority to JP 2006-328631 filed Dec. 5, 2006, the entire contents of which are hereby incorporated by reference.

TECHNICAL FIELD

The present invention relates to an optical glass and an optical element.

More specifically, it relates to an optical glass having high refractivity and low dispersion and anomalous partial dispersion capability suitable for a glass for lenses for use in cameras, projectors, etc., and having excellent processability, and an optical element formed of the above optical glass.

TECHNICAL BACKGROUND

In optical systems such as a camera, etc., there is generally employed a design for "achromatism", in which glasses having different Abbe's numbers are combined for removing the chromatic aberration of lenses. When glasses that are greatly different in Abbe's number are combined, a great effect is produced on the above removal. In particular, secondary achromatization requires an anomalous partial dispersion glass that has a partial dispersion ratio different from that of a normal optical glass. As an optical glass having a large Abbe's number and having the capability of anomalous partial dispersion, fluorophosphate glasses having an Abbe's number of 80 or more have been put to practical use. Since, however, these fluorophosphate glasses have a refractive index of 1.5 or less, they are not suitable for a lens having large refractive power.

Meanwhile, as an anomalous partial dispersion glass having a refractive index of over 1.5, for example, there is disclosed a fluorophosphate glass having a refractive index of 1.54 to 1.60, an Abbe's number of 68 to 75 and a partial dispersion ratio of at least 0.537 (for example, see JP H04-043854,B). However, this fluorophosphate glass is poor in mechanical properties and thermal properties and in particular has a problem that its abrasion degree is large and that its processability is poor. The processing cost thereof is inevitably high, and it has been difficult to provide high-performance lenses at a low cost.

As a light-weight anomalous partial dispersion glass, further, there is proposed an optical glass having a refractive index of 1.54 to 1.60, an Abbe's number of 70 to 80 and a specific gravity of less than 4.1 (for example, see JP 2003-160356,A). This optical glass is light in weight and excellent in optical properties. Similar to the glass disclosed in JP H04-043854,B, however, it cannot be said that the glass is fully satisfactory in any one of mechanical properties and thermal properties.

Meanwhile, a glass having high refractivity and low dispersion and anomalous partial dispersion capability is liable to have a high liquidus temperature. It is therefore required to produce a low-viscosity glass in order to avoid devitrification. When optical elements are produced from such a glass, however, the problem is that since striae are liable to occur on the surfaces of the optical elements obtained, the yield thereof is liable to be low.

DISCLOSURE OF THE INVENTION

Problems to be Solved by the Invention

Under the circumstances, it is an object of the present invention to provide an optical glass which has high refractivity and low dispersion and anomalous partial dispersion capability, which is excellent in processability and devitrification resistance and which ensures the inhibition of occurrence of striae, and optical elements formed of the above glass such as a high-performance lens and the like.

Means to Solve the Problems

For achieving the above object, the present inventor has made diligent studies and as a result has found that the above object can be achieved by a specific glass. On the basis of this finding, the present invention has been accordingly completed.

That is, the present invention provides (1) an optical glass having a refractive index (nd) of 1.54 to 1.60, an Abbe's number (vd) of 65 to 78, a partial dispersion ratio of 0.530 or more, a specific gravity of 4.0 or less and a viscosity, measured at its liquidus temperature, of 4 dPa·s or more (to be referred to as "optical glass I" hereinafter), (2) an optical glass comprising as cationic components, by cationic %,
    20 to 50% of $P^{5+}$,
    0.1 to 20% of $Al^{3+}$,
    0.1 to 20% of $Mg^{2+}$,
    0 to 20% of $Ca^{2+}$,
    0 to 20% of $Sr^{2+}$,
    0.1 to 30% of $Ba^{2+}$ and
    0 to 10% of $Y^{3+}$,
and further comprising, as anionic components, $F^-$ and $O^{2-}$, wherein the ratio of the content of $Mg^{2+}$ to the content of $Al^{3+}$, $Mg^{2+}/Al^{3+}$, based on cationic %, is 1.2 or less (to be referred to as "optical glass II" hereinafter), (3) an optical glass as recited in the above 2), wherein the ratio of the content of $Ba^{2+}$ to the total content, $R^{2+}$, of $M^{2+}$, $Ca^{2+}$, $Sr^{2+}$ and $Ba^{2+}$, $Ba^{2+}/R^{2+}$, based on cationic %, is less than 0.5, (4) an optical glass as recited in the above (2) or (3), which contains 20 to 50%, by anionic %, of $F^{31}$, (5) an optical glass as recited in any one of (2) to (4), which is free of $B^{3+}$, (6) an optical glass as recited in any one of the above (1) to (5), which has an abrasion degree of 550 or less, and (7) an optical element formed of the optical glass recited in any one of the above (1) to (6).

Effect of the Invention

According to the present invention, there can be provided an optical glass which has high refractivity and low dispersion and anomalous partial dispersion capability suitable as a glass for lenses for use in a camera, projector, etc., which is excellent in processability and devitrification resistance and which ensures the inhibition of occurrence of striae, and optical elements formed of the above glass such as a high-performance lens and the like.

The optical glass of the present invention can be suitably used as an anomalous partial dispersion glass for suppressing chromatic aberration. Having a low glass transition point, the optical glass of the present invention is press-moldable or formable at a low temperature and it is also suitable for use in press-molding with a precision-processed mold (precision press-molding).

PREFERRED EMBODIMENTS OF THE INVENTION

The optical glass of the present invention includes two embodiments, the optical glass I and the optical glass II. The optical glass I and the optical glass II will be explained one by one below.

(Optical Glass I)

The optical glass I characteristically has a refractive index (nd) of 1.54 to 1.60, an Abbe's number (vd) of 65 to 78, a partial dispersion ratio of 0.530 or more, a specific gravity of 4.0 or less and a viscosity, measured at its liquidus temperature, of 4 dPa·s or more.

In the optical glass I, the refractive index (nd) is preferably 1.545 to 1.60, more preferably 1.55 to 1.60, particularly preferably 1.56 to 1.60. Further, the Abbe's number (vd) thereof is preferably 66 to 78, more preferably 67 to 78, particularly preferably 68 to 78. In the optical glass I, further, the partial dispersion ratio is preferably over 0.530, more preferably 0.535 or more, particularly preferably 0.535 to 0.545.

The above partial dispersion ratio refers to a ratio of differences in refractive indices at certain two wavelength regions and is represented, for example, by the following equation.

$$P_{g,F}=(n_g-n_F)/(n_F-n_c)$$

wherein ng is a refractive index to g ray (435.83 nm), $n_F$ is a refractive index to F ray (486.13 nm) and $n_c$ is a refractive index to c ray (656.27 nm).

Generally, the above partial dispersion ratio and the Abbe's number have an almost linear relationship, and the property of deviating from the linear relationship is referred to as anomalous partial dispersion capability.

Since the optical glass I has high refractivity and low dispersion and anomalous partial dispersion capability, it can effectively perform the correction of the chromatic aberration of a lens and the downsizing of a lens unit, and there can be provided an optical system capable of performing secondary achromatization.

In the optical glass I, the specific gravity is preferably less than 3.95, more preferably 3.90 or less, particularly preferably 3.50 to 3.90. Since the weight of the optical glass I is so small, for example, the optical glass I can serve to decrease the weight of a lens, etc., formed thereof, and the load on a driving motor for an automatic focus.

In the optical glass I, further, the viscosity thereof at its liquidus temperature is preferably 5 dPa·s or more, more preferably 10 dPa·s or more, particularly preferably 20 to 1,000 dpa·s. Since the optical glass I has the above viscosity, it can serve to produce a glass material suitable for large-diameter lenses without causing internal defects such as striae.

The liquidus temperature of the optical glass I is preferably 850° C. or lower, more preferably 800° C. or lower, still more preferably 750° C. or lower.

In the optical glass I, the abrasion degree is preferably 550 or less, more preferably 500 or less, still more preferably 450 or less, particularly preferably 400 to 450.

When the optical glass I has an abrasion degree in the above range, the abrasion of the glass during its processing is decreased, its surface to be polished is not too soft, a high processed surface accuracy can be attained and a polishing mark scarcely remains on a polished surface.

In the optical glass I, the thermal expansion coefficient is preferably less than $160\times10^{-7}/°$ C., more preferably $155\times10^{-7}/°$ C. or less, still more preferably $150\times10^{-7}/°$ C. or less, particularly preferably $130\times10^{-7}/°$ C. to $150\times10^{-7}/°$ C. When the optical glass has a thermal expansion coefficient in the above range, it is improved in thermal shock resistance and it scarcely undergoes a cracking that can be caused by a difference from the temperature of a cutting fluid or the temperature of a washing medium. Further, when the glass surface is coated by vapor deposition, or the like, the time period for cooling the glass to room temperature can be decreased.

The composition of the optical glass specifically includes a glass composition that the optical glass II to be explained below has.

(Optical Glass II)

The optical glass comprises as cationic components, by cationic %, 20 to 50% of $P^{5+}$,
0.1 to 20% of $Al^{3+}$,
0.1 to 20% of $Mg^{2+}$,
0 to 20% of $Ca^{2+}$,
0 to 20% of $Sr^{2+}$,
0.1 to 30% of $Ba^{2+}$ and
0 to 10% of $Y^{3+}$, and further comprising, as anionic components, $F^-$ and $O^{2-}$, wherein the ratio of the content of $Mg^{2+}$ to the content of $Al^{3+}$, $Mg^{2+}/Al^{3+}$, based on cationic %, is 1.2 or less.

The composition of the optical glass II will be explained in detail below. A content of a cationic component by % stands for a content thereof by cationic % and a content of an anionic component by % stands for a content thereof by anionic % hereinafter unless otherwise specified.

$P^{5+}$ is a fundamental component for a fluorophosphate glass and is an essential cationic component for attaining devitrification resistance and high refractivity. When the content thereof is less than 20%, the devitrification resistance decreases and the refractive index is liable to decrease. When it exceeds 50%, the devitrification resistance is degraded and the Abbe's number is sometimes too small. The content of $P^{5+}$ is therefore 20 to 50%, and it is preferably 25 to 45%, more preferably 30 to 40%, particularly preferably 32 to 38%.

$Al^{3+}$ is an essential component for improving the fluorophosphate glass in devitrification resistance and inhibiting the thermal expansion thereof. When the content thereof is less than 0.1%, the devitrification resistance is poor, the liquidus temperature is high and it is difficult to form a high-quality glass by melting. When it exceeds 20%, the devitrification resistance tends to be degraded. The content of $Al^{3+}$ is therefore 0.1 to 20%, and it is preferably 1 to 20%, more preferably 3 to 18%, particularly preferably 5 to 15%.

$Mg^{2+}$ is an essential cationic component for improving the fluorophosphate glass in devitrification resistance, further decreasing the specific gravity thereof, decreasing the abrasion degree thereof and improving the processability thereof. When the content of $Mg^{2+}$ is less than 0.1%, the above effects thereof are hard to produce. When it exceeds 20%, the refractive index decreases and at the same time the devitrification resistance may decrease. Therefore, the content of $Mg^{2+}$ is 0.1 to 20%, and it is preferably 1 to 20%, more preferably 3 to 18%, particularly preferably 5 to 15%.

In the optical glass II, further, the ratio of the content of $Mg^{2+}$ to the content of $Al^{3+}$, $Mg^{2+}/Al^{3+}$, based on cationic % is 1.2 or less, and it is preferably 1.15 or less, more preferably 1.1 or less, still more preferably from 0.7 to 1.1.

A glass having high refractivity and low dispersion and anomalous partial dispersion capability is liable to have a high liquidus temperature. It is therefore required to produce a low-viscosity glass for preventing devitrification. As a result, there is involved a problem that the glass is liable to have striae, which results in a decrease in yields. The present inventor has made diligent studies to overcome this problem. It has been found that when the contents of $Al^{3+}$ and $Mg^{2+}$ are adjusted to the above ranges and when the ratio of the content of $Mg^{2+}$ to the content of $Al^{3+}$, $Mg^{2+}/Al^{3+}$, based on cationic % is adjusted to 1.2 or less, the striae can be suppressed while improving the glass in devitrification resistance and increasing the glass viscosity during the shaping from the glass, and the above problem has been accordingly overcome.

$Ca^{2+}$ is a cationic component for improving the fluorophosphate glass in devitrification resistance and further decreasing the abrasion degree thereof to improve the processability. When the content of $Ca^{2+}$ exceeds 20%, the refractive index may be decreased and at the same time the devitrification resistance may be decreased. The content of $Ca^{2+}$ is therefore 0 to 20%, and it is preferably 1 to 20%, more preferably 3 to 18%, particularly preferably 5 to 15%.

$Sr^{2+}$ is a cationic component for improving the fluorophosphate glass in devitrification resistance and improving the refractivity thereof. When the content of $Sr^{2+}$ exceeds 20%, the refractive index may be decreased and at the same time the devitrification resistance may be decreased. The content of $Sr^{2+}$ is therefore 0 to 20%, and it is preferably 1 to 20%, more preferably 3 to 18%, particularly preferably 5 to 15%.

While $Ba^{2+}$ is a component that increases the specific gravity and thermal expansion coefficient of the fluorophosphate glass and that increases the abrasion degree thereof to degrade the processability thereof, it is preferred to add a small amount of $Ba^{2+}$ for improving the fluorophosphate glass in devitrification resistance and improving its refractivity. When the content of $Ba^{2+}$ is less than 0.1%, the glass is liable to devitrify. When it exceeds 30%, the abrasion degree tends to increase to degrade the processability. The content of $Ba^{2+}$ is therefore 0.1 to 30%, and it is preferably 0.1 to 25%, more preferably 5 to 25%, still more preferably 10 to 25%, particularly preferably 10 to 20%.

In the optical glass II, alkaline earth metal ions such as $Mg^{2+}$, $Ca^{2+}$, $Sr^{2+}$, $Ba^{2+}$, etc., are introduced for improving the fluorophosphate glass in optical properties and improving the processability thereof. As described above, however, when $Ba^{2+}$ is introduced to excess, $Ba^{2+}$ works to increase the specific gravity and thermal expansion and works to increase the abrasion degree to degrade the processability. In the optical glass II, therefore, it is preferred to adjust the ratio of the content of $Ba^{2+}$ to the total content, $R^{2+}$ of $Mg^{2+}$, $Ca^{2+}$, $Sr^{2+}$ and $Ba^{2+}$, $Ba^{2+}/R^{2+}$, based on cationic %, to less than 0.5. The $Ba^{2+}/R^{2+}$ is more preferably 0.45 or less, still more preferably 0.4 or less, particularly preferably from 0.3 to 0.4. When $Ba^{2+}/R^{2+}$ is 0.5 or more, the abrasion degree is large and the processability decreases.

For improving the glass in devitrification resistance and at the same time achieving the object of the present invention, $R^{2+}$ is preferably adjusted to 35 to 60%, and it is more preferably 40 to 55%, particularly preferably 45 to 55%.

$Y^{3+}$ is a cationic component for improving the refractivity of the optical glass II and improving the glass in devitrification resistance and processability without impairing the anomalous partial dispersion capability. When the content of $Y^{3+}$ exceeds 10%, the glass tends to devitrify. Therefore, the content of $Y^{3+}$ is 0 to 10%, and it is preferably 1 to 10%, more preferably 1 to 8%, particularly preferably 1 to 5%.

Although $La^{3+}$ is not any essential component, it is a cationic component that improves the refractivity of the optical glass II without impairing its anomalous partial dispersion capability, and a small amount of $La^{3+}$ may be incorporated as an auxiliary to $Y^{3+}$. Since, however, the content of $La^{3+}$ exceeds 5%, the glass is liable to devitrify, the content of $La^{3+}$ is preferably limited to 0 to 5%, and it is more preferably 0 to 3%, still more preferably 0 to 1%.

For achieving the object of the present invention, the total content of the above cationic components is preferably adjusted to over 95%, and it is more preferably 98% or more, still more preferably 99% or more, yet more preferably 100%.

Further, $Sb^{3+}$, $Zn^{2+}$, $Li^+$, $Na^+$, $K^+$ and $Si^{4+}$ in an total content of less than 5% may be incorporated for adjusting the refractive index and Abbe's number, improving the devitrification resistance, adjusting thermal properties and improving mechanical properties. The above total content is preferably less than 2%.

When incorporated as a glass component, $B^{3+}$ has an effect on the adjustment of the refractive index and Abbe's number, the improvement of the devitrification resistance, the adjustment of thermal properties and the improvement of mechanical properties. Since, however, $B^{3+}$ causes the melting temperature to greatly increase (for example, over 1,000° C.) when introduced in a large amount, the melting apparatus that can be used is limited. Further, when $B^{3+}$ is introduced into the optical glass II containing $F^-$, a large amount of a white-fume-like compound containing B and F is generated during the melting, so that it is required to collect the white fume with a smoke and soot collector to dispose it. Furthermore, the contents of $B^{3+}$ and $F^-$ in the glass change due to the generation of the white fume, and the optical property of the glass is hence liable to change. Therefore, when the optical glass II contains $B^{3+}$, the content thereof is preferably limited to 0 to 1%, and it is more preferably limited to 0 to 0.5%. Still more preferably, no $B^{3+}$ is contained.

$Gd^{3+}$ is a component capable of adjusting the optical property and can be incorporated as a glass component. However, it increases the specific gravity and it also increases a cost since it is an expensive raw material. When the optical glass II contains $B^{3+}$, therefore, the content thereof is preferably limited to less than 3%, and it is more preferably limited to less than 1%. Still more preferably, no $B^{3+}$ is contained.

$F^-$ is an indispensable component for increasing the Abbe's number and improving the anomalous partial dispersion capability, while it weakens the glass structure, so that it is also a component that increases the thermal expansion and abrasion degree. When the content of $F^-$ is less than 20%, the Abbe's number is small and no sufficient anomalous partial dispersion capability can be obtained. When it exceeds 50%, the Abbe's number is too large and the thermal expansion coefficient and abrasion degree may increase. Further, when the glass is used in precision press-molding, a volatilization amount is caused to increase. Therefore, the content of $F^-$ is preferably adjusted to 20 to 50%, and it is more preferably 25 to 45%, still more preferably 25 to 40%, particularly preferably 30 to 40%.

The optical glass II contains $O^{2-}$ as an anionic component in addition to $F^-$. The content of $O^{2-}$ is preferably adjusted to 50 to 80%, and it is more preferably 55 to 75%, still more preferably 60 to 75%, particularly preferably 60 to 70%, The optical glass II may also contain, as anionic components, halogens such as $Cl^-$ and $I^-$ other than $F^-$ and $O^{2-}$. For achieving the object of the present invention, however, the total content of $F^-$ and $O^{2-}$ is preferably adjusted to 95% or more, and it is more preferably 98% or more, still more preferably 99%, particularly preferably 100%.

In the optical glass II, the abrasion degree is preferably 550 or less, more preferably 500 or less, still more preferably 450 or less, particularly preferably 400 to 450.

When the abrasion degree of the optical glass II is adjusted to a degree in the above range, the abrasion during processing is decreased, and the surface to be polished is not too soft, so that high processed-surface accuracy can be obtained and that a polishing mark scarcely remains on the polished surface.

The optical glass II preferably has a refractive index (nd), an Abbe's number (vd), a partial dispersion ratio, a specific gravity, a viscosity at its liquidus temperature and a thermal expansion coefficient similar to those of the above optical glass I.

The optical glass I or the optical glass II can be produced by weighing raw materials such as a phosphate, a fluoride, a carbonate, a nitrate, an oxide, etc., for their amounts corresponding to a glass composition to be obtained, mixing them, melting a mixture in a refractory crucible at approximately 900 to 1,000° C., stirring a molten glass and refining it.

Raw materials such as a hydroxide and a hydrate promote the volatilization of fluorine, and it is hence preferred not to use them. When the above mixture is melted, it is desirable to use a refractory cover.

One of the features of the optical glass I or the optical glass II is that the melting temperature thereof is low, and the melting can be carried out, for example, at 900° C. It is therefore possible to keep glass components from volatilizing during the melting, and a load on the environment can be hence decreased. In the optical glass I or the optical glass II, when the raw materials therefor are melted at 900° C. for 1 hour, the weight loss is 10% or less, preferably 5% or less, particularly preferably 0.1 to 3%.

A stirred and refined glass is formed into a predetermined shape by a forming method such as casting, bar forming, press-molding, or the like as required. When the forming is carried out from a glass in a molten state, the volatilization of components from a high-temperature glass surface causes the occurrence of striae. For inhibiting the volatilization of such glass components, it is preferred to employ a method in which a molten glass is caused to flow out and formed in a dry atmosphere or a method in which it is caused to flow out and formed in the atmosphere of an inert gas such as nitrogen gas (the inert gas is more desirably a dry inert gas). When the forming is carried out by casting, it is preferred to keep a glass in a casting mold as much as possible from being exposed to an ambient atmosphere. It is hence preferred to employ a method in which a casting mold having a through hole is used, a molten glass is introduced through one opening portion (inlet) of the through hole to fill glass in the through hole and a shaped glass material formed in the through hole is withdrawn through the other opening portion (outlet) of the through hole. Preferably, the shaped glass material taken out of the casting mold is subjected to procedures to bring the temperature inside the shaped glass material and the temperature on its surface close to each other for preventing the shaped glass material from breaking by its rapid cooling. For example, the shaped glass material is preferably transferred into an annealing furnace that is pre-heated to a temperature around its glass transition temperature, to be gradually cooled to room temperature. Thereafter, it is cut and a cut piece is ground and polished as required to be formed into a glass gob formed of a glass having a desired composition.

The optical element of the present invention will be explained below.

The optical element of the present invention is characteristically formed of the optical glass I or the optical glass II.

Since the optical glass I and the optical glass II is excellent in processability and devitrification resistance and ensures the inhibition of occurrence of striae, it can be said that optical elements formed of these glasses have high surface accuracy and transparency and have high productivity.

Examples of the optical elements include lenses such as an aspherical lens, etc, a lens array, a diffraction grating, a prism, and the like.

The method for producing the optical element of the present invention includes a method in which a shaped glass material or glass gob formed of the optical glass I or II is precision press-molded, a method in which a shaped glass material formed of the optical glass I or II is cut and a cut piece is ground and polished, and some other method. In particular, the method of precision press-molding is preferred.

The above precision press-molding is also called optics molding and well known in the field of this art. In the optical element, a surface that transmits, refracts, diffracts or reflects light is referred to as an optical-function surface (for example, lens surfaces such as an aspherical surface of an aspherical surface and a spherical surface of a spherical lens correspond to the optical-function surface). According to the precision press-molding, the optical-function surface can be formed by a press-molding method in which the form of molding surface of a press mold is accurately transferred to a glass, and the precision press-molding obviates machining procedures such as grinding and polishing for completing the optical-function surface.

As a press mold for the precision press-molding, there can be used a known press mold, such as a press mold that is made from a refractory ceramic mold material such as silicon carbide, zirconia, alumina, or the like and that has molding surface(s) provided with a mold release film. Above all, a press mold made of silicon carbide is preferred, and a carbon-containing film, etc., may be used as a mold release film. A carbon film is particularly preferred in view of durability and a cost.

In the precision press-molding, desirably, a non-oxidizing gas is employed for an atmosphere during molding in order to maintain the molding surface of the press mold under good conditions. As a non-oxidizing gas, nitrogen or a gas mixture of nitrogen with hydrogen is preferred.

EXAMPLES

The present invention will be explained further in detail with reference to Examples hereinafter, while the present invention shall not be limited by these Examples.

Examples 1-4 and Comparative Example 1

Raw materials such as phosphate, fluoride, carbonate, nitrate, oxide, etc., corresponding to a glass composition to be obtained are weighed for predetermined amounts and mixed, and the mixture is melted in a refractory crucible approximately at 900 to 1,000° C. A molten glass is stirred and refined, whereby an optical glass can be obtained.

Specifically, raw materials such as phosphate, fluoride, carbonate, nitrate, oxide, etc., corresponding to a glass composition shown in Table 1 were weighed for predetermined amounts and mixed, and the mixture was melted in a platinum crucible. For glasses in Examples 1 to 4, such a mixture was melted at a temperature of 900 to 1,000° C.

The molten glass was stirred and refined, and it was cast onto an iron plate to shape a glass block. The glass block was transferred into a furnace preheated to a temperature around its glass transition point, and it was annealed to room temperature.

Samples for various measurements were obtained from the thus-obtained glass block by cutting and measured for physical properties as follows.

A refractive index (nd) and an Abbe's number (vd) were measured according to Japan Optical Glass Industry Society Standard JOGIS-01.

A partial dispersion ratio ($P_{g,F}$) was calculated from $P_{g,F} = (n_g - n_F)/(n_F - n_c)$ in which $n_g$ is a refractive index to g ray, $n_F$ is a refractive index to F ray and $n_c$ is a refractive index to c ray.

A glass transition point (Tg) and a thermal expansion coefficient (α) were measured according to Japan Optical Glass Industry Society Standard JOGIS-08.

A specific gravity (Sg) was measured according to Japan Optical Glass Industry Society Standard JOGIS-05.

An abrasion degree (FA) was measured according to Japan Optical Glass Industry Society Standard JOGIS-10. A Knoop hardness was measured according to Japan Optical Glass Industry Society Standard JOGIS-09.

TABLE 1

| | Unit | Ex. 1 | Ex. 2 | Ex. 3 | Ex. 4 | CEx. 1 |
|---|---|---|---|---|---|---|
| $P^{5+}$ | C'nic % | 35.5 | 36.5 | 34.9 | 36.5 | 45.0 |
| $Al^{3+}$ | C'nic % | 12.9 | 9.7 | 8.5 | 9.7 | 18.8 |
| $Mg^{2+}$ | C'nic % | 10.0 | 6.8 | 10.0 | 10.0 | 0.0 |
| $Mg^{2+}/Al^{3+}$ | C'nic % ratio | 0.78 | 0.70 | 1.18 | 1.03 | 0.0 |
| $Ca^{2+}$ | C'nic % | 6.5 | 11.6 | 8.4 | 11.6 | 0.9 |
| $Sr^{2+}$ | C'nic % | 14.3 | 13.8 | 14.8 | 10.6 | 1.0 |
| $Ba^{2+}$ | C'nic % | 18.6 | 18.2 | 19.0 | 18.2 | 30.6 |
| $Ba^{2+}/R^{2+}$* | C'nic % ratio | 0.38 | 0.36 | 0.36 | 0.37 | 0.94 |
| $Y^{3+}$ | C'nic % | 2.2 | 3.4 | 4.4 | 3.4 | 3.4 |
| Cation total | | 100.0 | 100.0 | 100.0 | 100.0 | 99.7 |
| $O^{2-}$ | A'nic % | 62.3 | 60.0 | 61.3 | 65.2 | 60.7 |
| $F^{-}$ | A'nic % | 37.7 | 40.0 | 38.7 | 34.8 | 39.3 |
| Anion total | | 100.0 | 100.0 | 100.0 | 100.0 | 100.0 |
| Refractive index (nd) | | 1.56103 | 1.55708 | 1.56065 | 1.55900 | 1.56802 |
| Abbe's number (vd) | | 71.74 | 71.6 | 71.88 | 71.50 | 71.44 |
| Partial dispersion ratio (Pg, F) | | 0.5358 | 0.5398 | 0.5659 | 0.5345 | 0.5333 |
| Thermal expansion coefficient ($\alpha$) | $\times 10^{-7}/°C.$ | 138 | 148 | 145 | 145 | 139 |
| Glass transition temperature (Tg) | | 520 | 490 | 505 | 482 | 490 |
| Specific gravity (Sg) | | 3.8 | 3.86 | 3.75 | 3.84 | 4.05 |
| Abrasion degree (FA) | | 480 | 470 | 460 | 470 | 620 |
| Knoop hardness | | 350 | 330 | 330 | 340 | 340 |
| Liquidus temperature | °C. | 840 | 740 | 820 | 690 | 860 |
| Viscosity at liquidus temperature | dPa·s | 4 | 25 | 5 | 150 | 3 |

Ex. = Example,
CEx. Comparative Example
C'nic % = Cationic %,
A'nic % = anionic %
*$R^{2+}$: Total content of $Mg^{2+}$, $Ca^{2+}$, $Sr^{2+}$ and $Ba^{2+}$.

It is seen from Examples 1 to 4 that the optical glass of the present invention has a high refractive index (nd) of 1.55708 to 1.56103 and a high Abbe's number (vd) of 71.50 to 81.88, and it is seen on the basis of the relationship of the Abbe's number (vd) and the partial dispersion ratio ($_{Pg,F}$) that the optical glass of the present invention has anomalous partial dispersion capability. Further, it is also seen that the optical glass of the present invention has a small specific gravity of 3.75 to 3.86 (light in weight), has a high viscosity, measured at its liquidus temperature, of 4 to 150 dPa·s (capable of inhibiting the occurrence of striae) and has a small abrasion degree of 460 to 480 (excellent in processability).

When Examples 1 to 4 and Comparative Example 1 are compared, it is further seen that the optical glass of Comparative Example 1 containing no $Mg^{2+}$ and containing 30.6% of $Ba^{2+}$ has a large specific gravity of 4.05 (heavy), has a low viscosity, measured at its liquidus temperature, of 3 dPa·s (liable to cause the occurrence of striae) and has a high abrasion degree of 620 (poor in processability).

Example 5

Glass raw materials weighed for amounts corresponding to a glass composition of Example 1 shown in Table 1 was heated, melted, refined and homogenized in a melting vessel to prepare a molten glass, and the molten glass was caused to flow out into casting molds to obtain shaped glass materials having the forms of a rod, a plate, and the like.

These shaped glass materials were gradually cooled and then they were cut or split into glass pieces called cut pieces. The cut pieces were machined to prepare precision press-molding glass gobs whose entire surface each was smooth and which had predetermined weights. A mold release film may be formed on the surface of each of these glass gobs as required. Then, the above glass gobs were precision press-molded to produce optical elements in a manner that a glass gob was introduced into a precision press mold, the glass gob and the mold were heated together and the glass gob was precision press-molded.

In the above manner, the optical elements formed of the glass of Example 1 were produced. The thus-obtained optical elements had high transparency and were free of defects such as polishing marks, striae, etc., on their surfaces. High-quality optical elements were obtained. Further, in the above machining, no glass was broken.

In the above method, the glass gob and the precision press mold were heated together, while there may be employed other method in which a glass gob that has been separately heated is introduced into a pre-heated precision press mold and precision press-molded to produce an optical element.

For the preparation of the shaped glass material, the glass piece and the glass gob and for precision press-molding of the glass gob, known methods can be employed.

In the above manner, optical elements including various lenses such as aspherical lenses were produced. Each optical element may be provided with an optical multi-layer film such as an anti-reflection film as required.

Comparative Example 2

Optical elements were produced in the same manner as in Example 5 except that the glass of Example 1 was replaced with the glass of Comparative Example 1.

Defects such as polishing marks, striae, etc., were observed on the surface of each of the thus-obtained optical elements. Further, when machining was carried out, some of glasses were broken.

INDUSTRIAL UTILITY

The optical glass of the present invention is an optical glass that has high refractivity and low dispersion and anomalous partial dispersion capability and that has excellent processability and devitrification resistance and ensures that the occurrence of striae can be inhibited, so that, as an anomalous partial dispersion glass for suppressing chromatic aberration, it can be suitably used for lenses, for example, for use in cameras and projectors.

The invention claimed is:

1. An optical glass comprising as cationic components, by cationic %,
   20 to 50% of $P^{5+}$,
   0.1 to 20% of $Al^{3+}$,
   0.1 to 20% of $Mg^{2+}$,
   0 to 20% of $Ca^{2+}$,
   0 to 20% of $Sr^{2+}$,
   0.1 to 30% of $Ba^{2+}$ and
   0 to 10% of $Y^{3+}$,
   and further comprising, as anionic components, $F^-$ and $O^{2-}$, wherein the ratio of the content of $Mg^{2+}$ to the content of $Al^{3+}$, $Mg^{2+}/Al^{3+}$, based on cationic %, is 1.2 or less,
   wherein the total content of $P^{5+}$, $Al^{3+}$, $Mg^{2+}$, $Ca^{2+}$, $Sr^{2+}$, $Ba^{2+}$, $Y^{3+}$ and $La^{3+}$ is 100%, and
   wherein the ratio of the content of $Ba^{2+}$ to the total content, $R^{2+}$, of $Mg^{2+}$, $Ca^{2+}$, $Sr^{2+}$ and $Ba^{2+}$, $Ba^{2+}/R^{2+}$, based on cationic %, is less than 0.5,
   the optical glass having a refractive index (nd) of 1.54 to 1.60, an Abbe's number (vd) of 65 to 78, a partial dispersion ratio of 0.530 or more, a specific gravity of 4.0 or less and a viscosity, measured at its liquidus temperature, of 4 dPa·s or more.

2. The optical glass of claim 1, which contains 20 to 50%, by anionic %, of F.

3. The optical glass of claim 1, which has an abrasion degree of 550 or less.

4. An optical element formed of the optical glass of claim 1.

* * * * *